Sept. 4, 1951 T. R. KOMLINE 2,566,731
METHOD OF BURNING SEWAGE SLUDGE AND APPARATUS THEREFOR
Filed Oct. 31, 1945
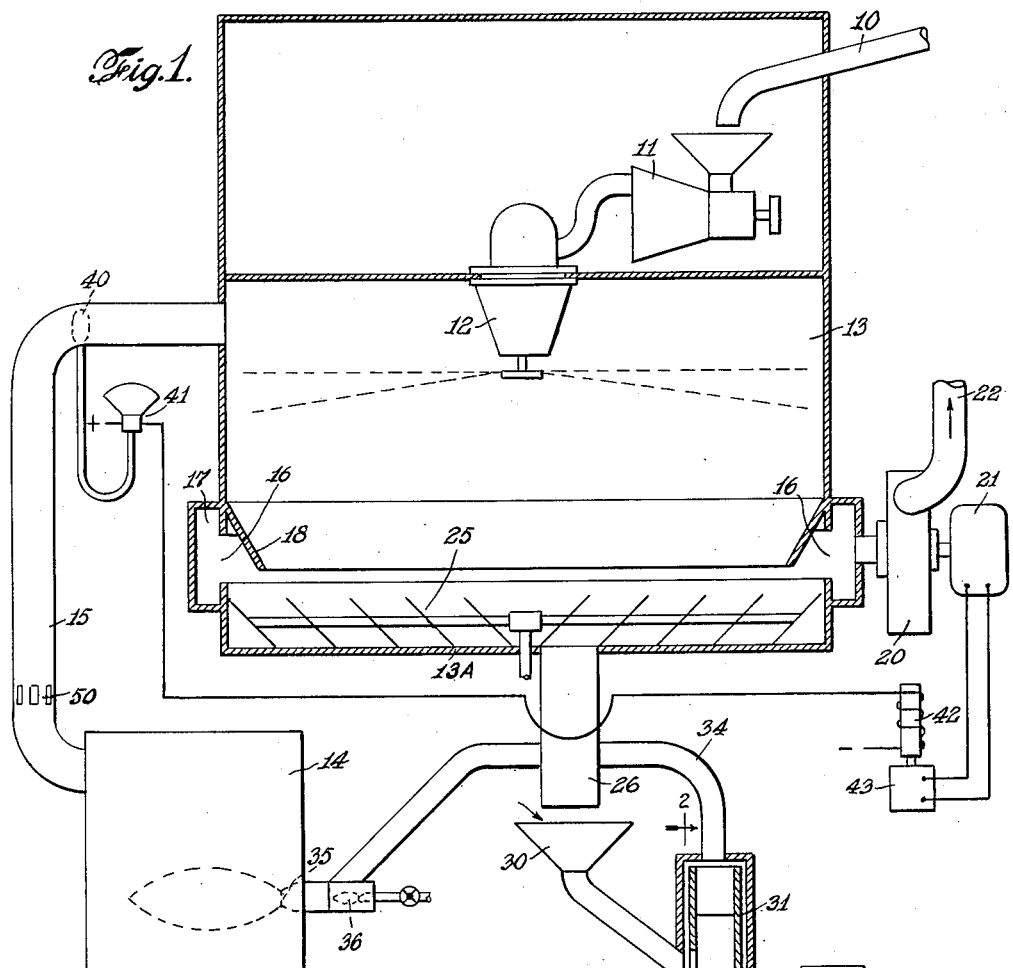
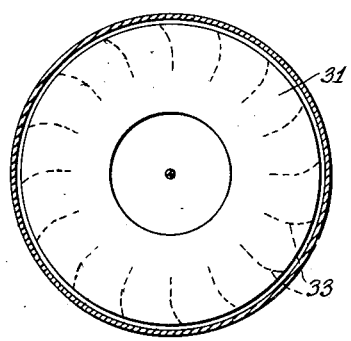
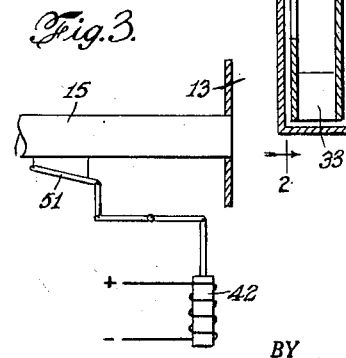
INVENTOR.
THOMAS R. KOMLINE
BY
E. W. Marshall
ATTORNEY.

Patented Sept. 4, 1951

2,566,731

UNITED STATES PATENT OFFICE 2,566,731

METHOD OF BURNING SEWAGE SLUDGE AND APPARATUS THEREFOR

Thomas R. Komline, Ridgewood, N. J., assignor to Komline-Sanderson Engineering Corporation, Glen Rock, N. J., a corporation of New Jersey Application October 31, 1945, Serial No. 625,758

5 Claims. (Cl. 110—8)

This invention relates to an improved method of burning sewage sludge and apparatus therefor. Its object is to dry and burn sewage sludge and to control automatically the heat generated thereby. In Patent No. 2,292,571, issued to me August 11, 1942, I disclosed a way of maintaining a predetermined temperature in burning dried sewage sludge by mixing it with variable quantities of another fuel. With better concentrations of sewage sludge available since that time it has become possible to burn the dried sludge without the additional auxiliary fuel. This improvement, in turn, makes possible a more simplified control of the drying and burning operation. The way this is accomplished and the apparatus provided for this purpose are described in the following specification and the novel features of both the method and apparatus are defined in claims.

Referring to the drawings:

Fig. 1 is a diagrammatic representation, partly in section, of an apparatus which is made according to and embodies my invention and which may be used for carrying out my novel method.

Fig. 2 is a sectional end elevation of a part of the apparatus shown in Fig. 1, the section being taken on the line 2—2 of the latter figure.

Fig. 3 is a side elevation, partly in section, of a modified arrangement which may be substituted for a part of the apparatus shown in Fig. 1.

Sewage sludge is led through a conduit 10 into a metering pump 11 and through a sprayer 12 into a drying chamber 13 where it is subjected to hot gases from a combustion chamber 14 through a flue 15 at temperatures ranging from 600° to 800° F., these gases being partially cooled by air admitted through ports 50. The finely divided dried sludge falls to the floor 13A of the drying chamber and the gases which have been cooled by the spray, together with the water which has been removed from the sludge in the form of steam, are drawn off through ports 16 into an annular chamber 17. A suction fan 20, driven by a motor 21, draws the gases and steam from the chamber 17 and discharges them together into a suitable chimney or flue 22. A baffle 18 extends over the ports 16.

25 is a rake or scraper which is rotated about a vertical axis and moves the dried sludge on the floor 13A of chamber 13 into a vertical chute 26. From the chute 26 the dried sludge is discharged into a hopper 30 of a propeller 31 driven by a motor 32. The propeller has a plurality of blades 33. It draws air in through the hopper 30 as indicated by an arrow. This makes a dust free operation and supplies air needed for combustion. The mixture of dried sludge and air is driven through a conduit 34 to an ignition nozzle 35 in the combustion chamber 14. 36 is a pilot light and auxiliary burner within the nozzle 35, supplying heat required for starting the operation and for maintaining warmth during shut-down periods.

40 is a thermostat in the flue 15 near the point of its discharge into the drying chamber 13. This is connected to actuate an indicating thermometer 41 which controls an electrical circuit indicated by + and —. A solenoid 42 is included in this circuit. The solenoid actuates a controller 43 which varies the speed of the motor 21.

When the sludge introduced through the conduit 10 is more than sufficiently concentrated it may produce an excess of sludge fuel passing out through the conduit 26, when considered in terms of the overall thermal requirements of the drier. A temperature of approximately 800° F. in the chamber 13 is required to dry the sludge. If an excess of dried sludge is produced and burned at 35 the temperature in the chamber 13 will tend to rise above the desired amount, with consequent charring of the organic portions of the sludge. Such a rise in the temperature will, through the actions of the thermostat 40 and controller 43, increase the speed of the motor 21. The rate of withdrawal of the gases and steam from the chamber 13 is increased thereby so that the amount of heat withdrawn from the chamber and forced up the chimney is increased, and the amount of air at atmospheric temperature drawn into the flue 15 through the ports 50 which cools the gases in the chamber 13, is increased. Thus, the sludge fed to the nozzle 35 is less thoroughly dried, and the temperature of the flame at the nozzle is decreased. This will decrease the efficiency of the drying apparatus and result in a decrease in the heat produced at the nozzle 35, the efficiency of the drier being expressed by the equation $$\frac{T_D - T_E}{T_D - T_A}$$

where $T_D$ is the drying temperature in the chamber 13, $T_E$ is the exhaust temperature in chimney 22 and $T_A$ is the atmospheric temperature. On the other hand, if the heat in chamber 13 is less than desired, the same instrumentalities will decrease the speed of the motor 21 with a resultant rise of the temperature in the chamber 13.

Another way of automatically maintaining the desired temperature in the drying chamber is to decrease the efficiency of the drying apparatus by running the motor 21 at a constant speed and controlling a damper 51 in flue 15 by the solenoid 42 to admit additional cooling air into the flue 15.

By the means disclosed herein a cycle control is effected automatically and the sludge is completely and effectively incinerated.

Various modifications in construction, mode of operation, method and use of an invention may and do occur to others, especially after benefitting from knowledge of such disclosure as that herein presented of the principles involved, but the invention itself is not confined to the present showing.

I claim:

1. A structure forming a combustion chamber, a structure forming a drying chamber, means for introducing sewage sludge into the drying chamber, an ignition nozzle in the combustion chamber, means for moving dried sewage sludge from the drying chamber to the nozzle, a flue for leading the gases of combustion from the combustion chamber to the drying chamber, means for withdrawing said gases from the drying chamber at variable rates, and means actuated by variations in the temperature of the drying gases in the flue to control automatically said means of withdrawal.

2. A structure forming a combustion chamber, a structure forming a drying chamber, means for introducing sewage sludge into the drying chamber, an ignition nozzle in the combustion chamber, means for moving dried sludge from the drying chamber to the nozzle, a flue between the combustion chamber and the drying chamber, means for withdrawing gases from the drying chamber at variable rates, and automatic means thermostatically controlled by the temperature of the gases in the flue to variably control said means of withdrawal.

3. A structure forming a combustion chamber, a structure forming a drying chamber, means for introducing sewage sludge into the drying chamber, an ignition nozzle in the combustion chamber, means for moving dried sewage sludge from the drying chamber to the nozzle, a flue interconnecting the combustion chamber and the drying chamber, a variable speed fan for withdrawing gases from the drying chamber, an electro-mechanical device for varying the speed of the fan, and a thermostat, actuated by the temperature of the gases in the flue for controlling said electro-mechanical device.

4. The method which consists of discharging comminuted sewage sludge into a drying chamber, moving the dried sludge to a combustion chamber, burning the dried sludge therein, passing gases heated by such combustion into the drying chamber, withdrawing the gases from the drying chamber at variable rates and controlling the rate of withdrawal of said gases automatically by variations in the temperature thereof.

5. A structure forming a combustion chamber, a structure forming a drying chamber, means for introducing sewage sludge into the drying chamber, an ignition nozzle in the combustion chamber, means for moving dried sludge from the drying chamber to the nozzle, a flue between the combustion chamber and the drying chamber, means for introducing cooling air into the flue and means automatically actuated by variations in the temperature of the drying gases in the flue for varying the amount of air introduced into the flue to maintain an even temperature in the drying chamber.

THOMAS R. KOMLINE.

REFERENCES CITED

The following references are of record in the file of this patent:

UNITED STATES PATENTS

| Number | Name | Date |
|---|---|---|
| 952,775 | Whitlatch | Mar. 22, 1910 |
| 1,603,760 | Furkert | Oct. 19, 1926 |
| 1,707,281 | Sauvage | Apr. 2, 1929 |
| 1,826,748 | Delamere | Oct. 13, 1931 |
| 2,160,968 | Hagen | June 6, 1939 |
| 2,202,793 | Hagen | May 28, 1940 |
| 2,292,571 | Komline | Aug. 11, 1942 |
| 2,396,777 | Edwards | Mar. 19, 1946 |

FOREIGN PATENTS

| Number | Country | Date |
|---|---|---|
| 270,184 | Great Britain | Dec. 7, 1926 |